United States Patent
Ito et al.

(10) Patent No.: US 10,652,007 B2
(45) Date of Patent: May 12, 2020

(54) TIME SYNCHRONIZATION CLIENT, SYNCHRONIZATION METHOD, COMPUTER PROGRAM PRODUCT, AND SYNCHRONIZATION SYSTEM

(71) Applicant: Kabushiki Kaisha Toshiba, Minato-ku (JP)

(72) Inventors: Masashi Ito, Yokohama (JP); Akira Kawarada, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 81 days.

(21) Appl. No.: 15/691,397

(22) Filed: Aug. 30, 2017

(65) Prior Publication Data
US 2018/0191485 A1    Jul. 5, 2018

(30) Foreign Application Priority Data

Jan. 4, 2017 (JP) ................................ 2017-000147

(51) Int. Cl.
G06F 15/16 (2006.01)
H04L 7/00 (2006.01)
H04L 29/06 (2006.01)

(52) U.S. Cl.
CPC .......... H04L 7/0033 (2013.01); H04L 7/0008 (2013.01); H04L 67/42 (2013.01)

(58) Field of Classification Search
CPC ... H04L 7/0033; H04L 7/0008; H04L 7/0012; H04L 67/42; H04L 12/28; H04L 12/56; H04L 7/00; G06F 1/14; G06F 13/00

USPC .......................................... 709/248, 246, 247
See application file for complete search history.

(56) References Cited

U.S. PATENT DOCUMENTS

| | | | | |
|---|---|---|---|---|
| 4,005,266 A | * | 1/1977 | Lehr | G04G 7/00 375/343 |
| 5,737,747 A | * | 4/1998 | Vishlitzky | G06F 12/0866 348/E5.008 |
| 6,775,707 B1 | * | 8/2004 | Bennett | H04B 7/18593 370/395.4 |
| 7,110,525 B1 | * | 9/2006 | Heller | H04M 3/523 379/265.11 |
| 7,412,533 B1 | * | 8/2008 | Johnson | H04L 12/1827 709/231 |
| 2002/0097181 A1 | * | 7/2002 | Chou | G01S 5/0036 342/357.29 |
| 2002/0129290 A1 | * | 9/2002 | Couillard | G06F 1/14 713/400 |

(Continued)

FOREIGN PATENT DOCUMENTS

JP    2003-110562    4/2003
JP    3419407 B1    6/2003

*Primary Examiner* — Thu Ha T Nguyen
(74) *Attorney, Agent, or Firm* — Oblon, McClelland, Maier & Neustadt, L.L.P.

(57) ABSTRACT

According to an embodiment, a time synchronization client includes one or more processors. The one or more processors are configured to perform time synchronization according to time information received by communicating with a time synchronization server at every synchronization period, and determine a second synchronization period shorter than a first synchronization period of when synchronization accuracy is a target level or more, as the synchronization period, when an elapsed time from activation of the time synchronization client does not exceed a judgment time.

11 Claims, 9 Drawing Sheets

(56) References Cited

U.S. PATENT DOCUMENTS

| | | | | |
|---|---|---|---|---|
| 2005/0289453 | A1* | 12/2005 | Segal | G06F 1/12 715/203 |
| 2008/0077857 | A1* | 3/2008 | Olson | G06F 16/9577 715/246 |
| 2008/0165789 | A1* | 7/2008 | Ansari | H04L 41/12 370/401 |
| 2009/0086764 | A1* | 4/2009 | Lee | H04J 3/0667 370/503 |
| 2009/0276542 | A1* | 11/2009 | Aweya | H04J 3/0667 709/248 |
| 2012/0300859 | A1* | 11/2012 | Chapman | H04J 3/0667 375/257 |
| 2012/0311168 | A1* | 12/2012 | Dougan | H04L 69/28 709/230 |
| 2013/0028112 | A1* | 1/2013 | Mizutani | H04L 43/106 370/252 |
| 2015/0095494 | A1* | 4/2015 | Lin | H04L 67/1004 709/225 |
| 2015/0111616 | A1* | 4/2015 | Kim | G06F 13/00 455/566 |
| 2015/0341874 | A1* | 11/2015 | Nguyen-Dang | H04W 52/0209 370/350 |
| 2015/0373074 | A1* | 12/2015 | Lohmar | H04L 65/4076 709/219 |
| 2016/0006837 | A1* | 1/2016 | Reynolds | H04W 84/18 709/203 |
| 2016/0104173 | A1* | 4/2016 | Sharp | G06Q 30/0201 705/7.29 |
| 2016/0161964 | A1* | 6/2016 | Sato | G06F 13/00 700/297 |
| 2018/0026840 | A1* | 1/2018 | Toepke | H04L 67/06 709/222 |
| 2018/0048457 | A1* | 2/2018 | Dzung | H04J 3/0667 |
| 2018/0096129 | A1* | 4/2018 | Nishida | G06F 13/00 |
| 2018/0145863 | A1* | 5/2018 | Chaloupka | H04L 43/0852 |
| 2018/0284169 | A1* | 10/2018 | Kwan | H02J 3/14 |
| 2019/0140758 | A1* | 5/2019 | Cotter | H04J 3/0667 |
| 2019/0179493 | A1* | 6/2019 | Goenka | H04L 67/22 |

\* cited by examiner

TIME SYNCHRONIZATION CLIENT, SYNCHRONIZATION METHOD, COMPUTER PROGRAM PRODUCT, AND SYNCHRONIZATION SYSTEM

CROSS-REFERENCE TO RELATED APPLICATIONS

This application is based upon and claims the benefit of priority from Japanese Patent Application No. 2017-000147, filed on Jan. 4, 2017; the entire contents of which are incorporated herein by reference.

FIELD

Embodiments described herein relate generally to a time synchronization client, a synchronization method, a computer program product, and a synchronization system.

BACKGROUND

Systems to perform time synchronization among a plurality of devices are known. For example, a device that transmits a request signal for time adjustment to another device with constant periods, and performs time synchronization, using a response signal, to the request signal, received from the another device is disclosed. Further, a technology to set a synchronization period to be larger than initial setting, when an error between a time after time synchronization and a time of a server falls within a predetermined value, is disclosed.

However, conventionally, a time required to reach synchronization accuracy of a target level from the activation of the device cannot be regulated, and time synchronization that satisfies the target level sometimes takes a time.

DETAILED DESCRIPTION

According to an embodiment, a time synchronization client includes one or more processors. The one or more processors are configured to perform time synchronization according to time information received by communicating with a time synchronization server at every synchronization period, and determine a second synchronization period shorter than a first synchronization period of when synchronization accuracy is a target level or more, as the synchronization period, when an elapsed time from activation of the time synchronization client does not exceed a judgment time.

Hereinafter, embodiments will be described in detail with reference to the appended drawings.

First Embodiment

Figure 1:
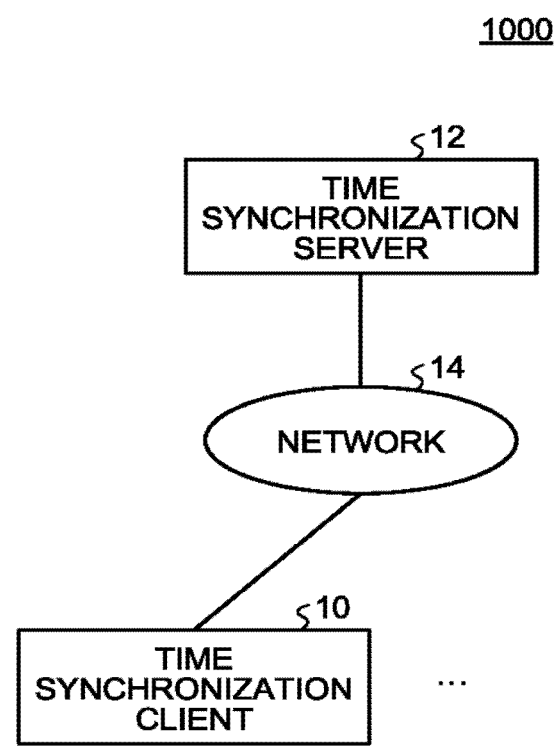
FIG. 1 is a diagram illustrating a configuration example of a synchronization system.

FIG. 1 is a diagram illustrating an example of a configuration of a synchronization system 1000 of the present embodiment. As illustrated in FIG. 1, the synchronization system 1000 includes a time synchronization server 12 and a time synchronization client 10. The time synchronization server 12 and the time synchronization client 10 are connected through a network 14.

The network 14 can be realized by one or more network devices that relay data, such as switch devices.

The time synchronization server 12 clocks a reference time for time synchronization. The time synchronization server 12 is a computer such as a server device that serves a reference time, for example.

The time synchronization client 10 is a client device for the time synchronization server 12 as a server device. The time synchronization client 10 communicates (transmits/receives) a synchronization message for time synchronization with (to/from) the time synchronization server 12 through the network 14. Then, the time synchronization client 10 synchronizes its own local time, using time information included in the synchronization message received from the time synchronization server 12. The time synchronization client 10 is, for example, industrial equipment.

Note that the synchronization system 1000 may have a configuration including a plurality of the time synchronization clients 10 that communicates with the time synchronization server 12. Further, the synchronization system 1000 may include a plurality of devices other than the time synchronization server 12 and the time synchronization client 10.

Figure 2:
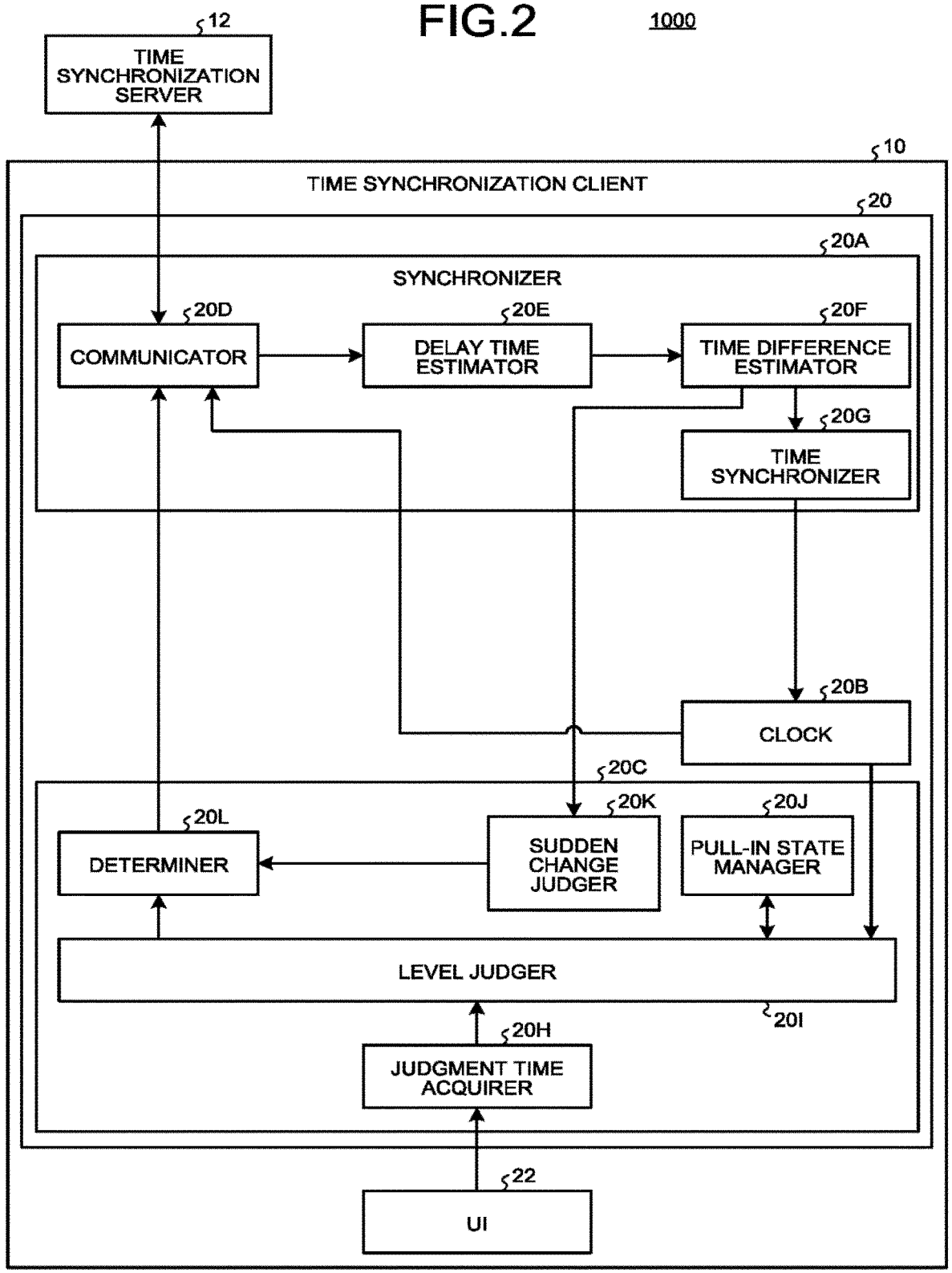
FIG. 2 is a diagram illustrating a configuration example of a time synchronization client.

FIG. 2 is a diagram illustrating an example of a configuration of the time synchronization client 10 of the present embodiment. The time synchronization client 10 includes a controller 20 and a UI 22. The controller 20 and the UI 22 are communicatively connected.

The UI 22 has an input function to receive an operation instruction by a user and a display function to display various images. Note that the UI 22 may just have a configuration including at least the input function. The input function is realized by a keyboard, a mouse, and the like, for example. The display function is realized by a display, for example. Note that the UI 22 may be a touch panel in which the input function and the display function are integrally configured, or the like.

The controller 20 controls the time synchronization client 10. The controller 20 includes a synchronizer 20A, a clock 20B, and a synchronization period determiner 20C. The synchronizer 20A includes a communicator 20D, a delay time estimator 20E, a time difference estimator 20F, and a time synchronizer 20G. The synchronization period determiner 20C includes a judgment time acquirer 20H, a level judger 20I, a pull-in state manager 20J, a sudden change judger 20K, and a determiner 20L.

The synchronizer 20A, the clock 20B, the synchronization period determiner 20C, the communicator 20D, the delay time estimator 20E, the time difference estimator 20F, the time synchronizer 20G, the judgment time acquirer 20H, the level judger 20I, the pull-in state manager 20J, the sudden change judger 20K, and the determiner 20L are realized by one or a plurality of processors, for example. For example, the above components may be realized by execution of a program by a processor such as a central processing unit (CPU), that is, by software. The above components may be realized by a processor such as a special integrated circuit (IC), that is, hardware. The above components may be realized by use of the software together with the hardware. In a case of using a plurality of processors, each processor may realize one of the components or may realize two or more of the components.

The clock 20B clocks a local time as a time inside the time synchronization client 10. Here, the clock 20B also functions as a timer that clocks a synchronization period, using the local time clocked by the clock 20B, and a timer to clock an elapsed time, using the local time. The elapsed time is an elapsed time from activation of the time synchronization client 10.

The synchronization period is a transmission period of the synchronization message that is transmitted from the time synchronization client 10 to the time synchronization server 12. The synchronization period is determined by the synchronization period determiner 20C (details will be described below).

The synchronizer 20A receives the time information from the time synchronization server 12 by communicating with the time synchronization server 12 at every synchronization period determined by the synchronization period determiner 20C. The synchronizer 20A then performs time synchronization for the clock 20B according to the received time information.

Figure 3:
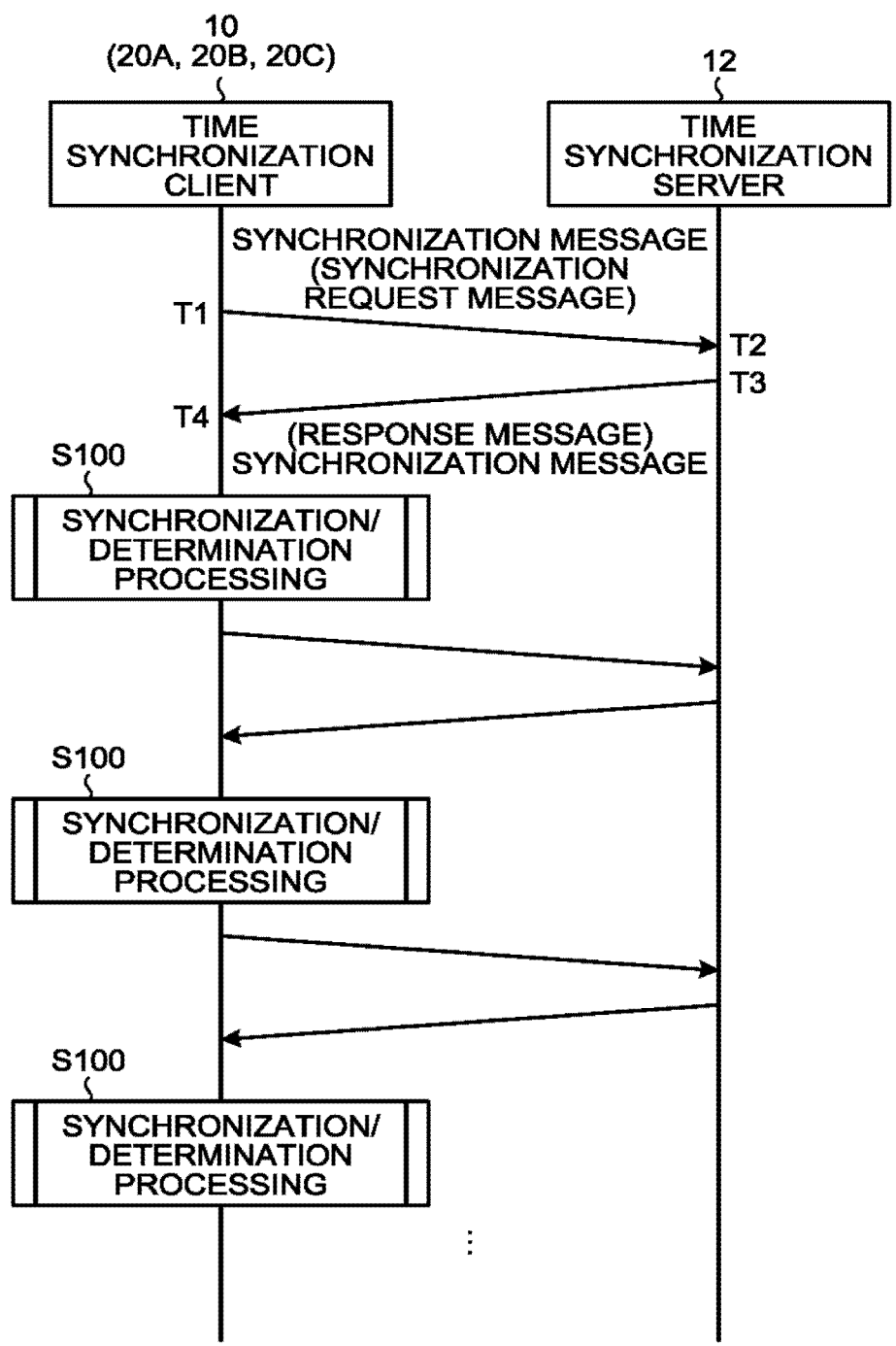
FIG. 3 is a sequence diagram illustrating an example of a procedure of communication of a synchronization message.

FIG. 3 is a sequence diagram illustrating an example of a communication procedure of the synchronization message between the time synchronization client 10 and the time synchronization server 12.

Examples of the synchronization message communicated (transmitted/received) between the time synchronization client 10 and the time synchronization server 12 includes a synchronization request message and a response message that is a response to the synchronization request message.

In the present embodiment, the synchronizer 20A of the time synchronization client 10 transmits the synchronization request message to the time synchronization server 12 at every synchronization period determined by the synchronization period determiner 20C. The synchronization request message includes, for example, a time stamp T1 indicating the local time clocked by the clock 20B of the time synchronization client 10.

The time synchronization server 12 that has received the synchronization request message transmits, to the time synchronization client 10, the response message to the synchronization request message.

The response message includes a time stamp T2 and a time stamp T3. The time stamp T2 indicates a reference time when the synchronization request message is received. The time stamp T3 indicates a reference time when the response message to the synchronization request message is transmitted. The time stamps T2 and T3 correspond to the time information received from the time synchronization server 12.

The reference time is a time clocked by the time synchronization server 12. The time synchronization server 12 includes a clock that clocks the reference time that is a time inside the time synchronization server 12. The time synchronization server 12 transmits, to the time synchronization client 10, the response message including the time stamp T2 indicating the reference time when the synchronization request message is received from the time synchronization client 10, and the time stamp T3 indicating the reference time to transmit the response message to the synchronization request message.

The synchronizer 20A of the time synchronization client 10 receives the response message from the time synchronization server 12. The synchronizer 20A manages a time stamp T4 indicating the local time clocked by the clock 20B of the time synchronization client 10 when receiving the response message.

The reciprocating of the synchronization message between the time synchronization client 10 and the time synchronization server 12 is periodically performed at every synchronization period. The time synchronization client 10 then executes synchronization/determination processing in every reciprocating of the synchronization message (step S100).

The synchronization/determination processing includes synchronization processing and determination processing. The synchronization processing is processing of performing time synchronization according to the time information (the time stamps T2 and T3) included in the response message. The determination processing is processing of determining the synchronization period.

The synchronization/determination processing is executed by the synchronizer 20A and the synchronization period determiner 20C of the time synchronization client 10 (details will be described below).

Note that FIG. 3 illustrates a case in which the synchronization request message is transmitted from the time synchronization client 10 to the time synchronization server 12, and the response message is transmitted from the time synchronization server 12 to the time synchronization client 10.

However, a message urging synchronization may be transmitted from the time synchronization server 12 to the time synchronization client 10, and the synchronization request message may be transmitted from the time synchronization client 10 to the time synchronization server 12 upon the message.

Note that, in the present embodiment, a case in which the time synchronization client 10 performs the synchronization/determination processing will be described as an example.

Referring back to FIG. 2 and description will be continued. The synchronizer 20A includes the communicator 20D, the delay time estimator 20E, the time difference estimator 20F, and the time synchronizer 20G.

The communicator 20D communicates with the time synchronization server 12. To be specific, the communicator 20D transmits the synchronization message to the time synchronization server 12 at every synchronization period determined by the synchronization period determiner 20C. In detail, the communicator 20D transmits the synchronization request message to the time synchronization server 12 when a time according to the synchronization period determined by the synchronization period determiner 20C has elapsed from a transmission time when last time the synchronization request message was transmitted to the time synchronization server 12. The communicator 20D then employs the local time clocked by the clock 20B as the time stamp T1 when transmitting the synchronization request message (see FIG. 3).

Further, the communicator 20D receives the response message from the time synchronization server 12. The communicator 20D then employs the local time clocked by the clock 20B as the time stamp T4 when receiving the response message (see FIG. 3).

The delay time estimator 20E estimates a communication delay time between the time synchronization client 10 and the time synchronization server 12. The communication delay time is a delay time from the actual reference time, which occurs when the time synchronization client 10 synchronizes the own local time according to the reference time clocked by the time synchronization server 12. The communication delay time is a time required for communication from the transmission of the response message by the time synchronization server 12 to the reception of the response message by the time synchronization client 10.

However, the time (time stamp T3) when the time synchronization server 12 transmits the response message is the time clocked according to the reference time of the time synchronization server 12. Meanwhile, the time (time stamp T4) when the time synchronization client 10 receives the response message is the time clocked according to the local time of the time synchronization client 10. The time synchronization client 10 side cannot obtain a measured value of an error between the reference time and the local time, and thus cannot directly measure the communication delay time.

Therefore, in the present embodiment, the delay time estimator 20E estimates the communication delay time by the following formula (1), for example.

$$\text{The communication delay time} = \{(T4-T1)-(T3-T2)\}/2 \quad (1)$$

In the formula (1), T1 to T4 respectively represents the time stamps T1 to T4. Note that the method of estimating the communication delay time by the delay time estimator 20E is not limited to the method using the formula (1).

Next, the time difference estimator 20F will be described. The time difference estimator 20F estimates a time difference between the reference time of the time synchronization server 12 and the local time clocked by the clock 20B of the time synchronization client 10. Here, a timing difference corresponding to the communication delay time occurs between timing when the time synchronization client 10 receives the response message from the time synchronization server 12 and timing when the time synchronization server 12 transmits the response message.

That is, the time synchronization client 10 cannot directly measure the reference time of the time synchronization server 12. Therefore, the time difference estimator 20F of the time synchronization client 10 estimates the reference time of the time synchronization server 12, and estimates the time difference between the estimated reference time and the local time clocked by the clock 20B. To be specific, the time difference estimator 20F estimates the time difference by the following formula (2).

$$\text{The time difference} = (T3 + \text{the communication delay time}) - T4 \quad (2)$$

In the formula (2), T3 and T4 are similar to those in the formula (1). Further, the communication delay time in the formula (2) is a value estimated by the formula (1). That is, the time difference estimator 20F estimates a time obtained by adding the communication delay time to the time stamp T3, as the reference time when the time synchronization server 12 transmits the response message. Then, the time difference estimator 20F estimates the difference between the estimated reference time and the time stamp T4 that is the local time when the response message is received, as the time difference.

Next, the time synchronizer 20G will be described. The time synchronizer 20G performs the time synchronization of the clock 20B, using the time difference estimated in the time difference estimator 20F.

For example, the time synchronizer 20G sets the time difference estimated by the time difference estimator 20F to the clock 20B. With the setting, the clock 20B corrects the local time to be clocked. With the correction, the local time clocked by the clock 20B is shifted by the time difference, and is time synchronized with the reference time clocked by the time synchronization server 12.

Next, the synchronization period determiner 20C will be described. As described above, in the time synchronization client 10 of the present embodiment, the synchronization period determiner 20C determines the synchronization period by the synchronizer 20A.

The synchronization period determiner 20C includes the judgment time acquirer 20H, the level judger 20I, the pull-in state manager 20J, the sudden change judger 20K, and the determiner 20L.

The judgment time acquirer 20H acquires a judgment time.

The judgment time is a target time required from the activation of the time synchronization client 10 to when the time synchronization with synchronization accuracy that satisfies the target level is performed by the synchronizer 20A. The synchronization accuracy that satisfies the target level means that the time difference between the local time of the time synchronization client 10 and the reference time of the time synchronization server 12 is a predetermined value or less. This predetermined value may just be set in advance. Note that satisfying the target level is the same meaning as being the target level or more.

The judgment time may just be an arbitrary time of the user. Note that the judgment time is favorably at least a second period or more.

In the present embodiment, the judgment time acquirer 20H acquires the judgment time from the UI 22. To be specific, the arbitrary judgment time is input by an operation of the UI 22 by the user. Then, the UI 22 outputs the judgment time received by the operation of the user to the controller 20. With the output, the judgment time acquirer 20H of the controller 20 acquires the judgment time from the UI 22.

Note that the judgment time acquirer 20H may acquire the judgment time from a storage such as a hard disk drive (HDD). In this case, the judgment time stored in the storage may be changeable with an operation instruction of the UI 22 by the user. Further, the judgment time acquirer 20H may acquire the judgment time by reception of the judgment time from another device through the network 14.

The level judger 20I judges whether the elapsed time from activation of the time synchronization client 10 exceeds the judgment time acquired by the judgment time acquirer 20H. In other words, in the present embodiment, the level judger 20I judges that the synchronization accuracy of the clock 20B performed by the time synchronizer 20G is the target level or more, when the elapsed time from activation of the time synchronization client 10 exceeds the judgment time. Further, the level judger 20I judges that the synchronization accuracy of the clock 20B performed by the time synchronizer 20G is less than the target level, when the elapsed time from activation of the time synchronization client 10 does not exceed the judgment time.

That is, in the present embodiment, the level judger 20I judges whether the synchronization accuracy of the clock 20B is the target level or more, or is less than the target level, using the elapsed time from activation of the time synchronization client 10 and the judgment time. The synchronization accuracy being the target level or more indicates that the synchronization accuracy of the local time of the clock 20B to the reference time is in a state of satisfying the target level. The synchronization accuracy being less than the target level indicates that the synchronization accuracy of the local time of the clock 20B to the reference time is in a state of not satisfying the target level.

In the present embodiment, the level judger 20I judges whether the elapsed time from activation exceeds the judgment time, when a pull-in state managed by the pull-in state manager 20J is during pull-in.

The pull-in state indicates whether the synchronization accuracy of the local time clocked by the clock 20B to the reference time is in the state of satisfying the target level. The pull-in state includes two types of states: during pull-in and pull-in completion. The during pull-in indicates that the synchronization accuracy of the local time clocked by the clock 20B to the reference time is in a state of being less than the target level. The pull-in completion indicates that the synchronization accuracy of the local time clocked by the clock 20B to the reference time is in a state of the target level or more.

The pull-in state manager 20J manages whether the pull-in state of the clock 20B of the time synchronization client 10 is either the during pull-in or the pull-in completion. Note that the pull-in state manager 20J sets the pull-in state to the during pull-in at the activation of the time synchronization client 10. The pull-in state manager 20J then transitions the pull-in state from the during pull-in to the pull-in completion, or from the pull-in completion to the during pull-in, according to processing described below.

The level judger 20I judges whether the elapsed time from activation of the time synchronization client 10 exceeds the judgment time, when the pull-in state managed by the pull-in state manager 20J is the during pull-in.

The determiner 20L determines the synchronization period. In the present embodiment, the determiner 20L prepares two types of synchronization periods as the synchronization period. In the present embodiment in advance, the determiner 20L stores a first synchronization period and a second synchronization period in advance.

The first synchronization period is the synchronization period of when the synchronization accuracy is the target level or more. The second synchronization period is the synchronization period of when the synchronization period is less than the target level. The second synchronization period is shorter than the first synchronization period.

In the present embodiment, the determiner 20L determines the synchronization period, using the judgment time. To be specific, when the level judger 20I judges that the elapsed time does not exceed the judgment time, the determiner 20L determines the second synchronization period as the synchronization period, recognizing that the synchronization accuracy is less than the target level. The determiner 20L then outputs the determined synchronization period to the synchronizer 20A.

Then, when the level judger 20I judges that the elapsed time exceeds the judgment time, the pull-in state manager 20J transitions the pull-in state to the pull-in completion. Then, in this case, the determiner 20L determines first synchronization period as the synchronization period, recognizing that the synchronization accuracy is the target level or more. The determiner 20L then outputs the determined synchronization period to the synchronizer 20A.

Note that the determiner 20L is not limited to the configuration to store one value for each of the first synchronization period and the second synchronization period in advance. For example, the determiner 20L may store a plurality of values for each of the first synchronization period and the second synchronization period, in advance.

In this case, for example, the determiner 20L stores the plurality of values as the first synchronization period and the elapsed time in association with each other. Further, the determiner 20L stores the plurality of values as the second synchronization period and the elapsed time in association with each other. The plurality of values as the second synchronization period may just be values smaller than the plurality of values as the first synchronization period. Then, the determiner 20L may just set, in advance, values that become larger or smaller in a stepwise or continuous manner according to the elapsed time as the values corresponding to the elapsed time. Further, the determiner 20L may store a function that represents the relationship between the plurality of values and the elapsed time in advance.

The determiner 20L then may determine the first synchronization period and the second synchronization period by reading the values corresponding to the elapsed time from the storage.

Meanwhile, when the pull-in state managed by the pull-in state manager 20J is the pull-in completion, the sudden change judger 20K judges whether change of the time difference indicates sudden change. The sudden change judger 20K judges whether the change of the time difference indicates the sudden change, using the time difference estimated by the time difference estimator 20F.

To be specific, the sudden change judger 20K judges that the change of the time difference indicates the sudden change, when the number of times by which a difference between the time difference estimated by the time difference estimator 20F and the time difference estimated by the time difference estimator 20F last time continuously exceed a sudden change threshold becomes a threshold of the number of times or more. The sudden change threshold and the threshold of the number of times may be set in advance. Further, the sudden change threshold and the threshold of the number of times may be made changeable with an operation instruction of the UI 22 by the user.

When the sudden change judger 20K judges that the change of the time difference indicates the sudden change, the pull-in state manager 20J transitions the pull-in state from the pull-in completion to the during pull-in.

Then, when the sudden change judger 20K judges that the change of the time difference indicates the sudden change, the determiner 20L determines the second synchronization period as the synchronization period, recognizing that the synchronization accuracy is less than the target level. Therefore, the determiner 20L determines the second synchronization period as the synchronization period, when the change of the time difference is judged to indicate the sudden change, even if the elapsed time from activation of the time synchronization client 10 exceeds the judgment time. Then, the determiner 20L outputs the determined synchronization period to the synchronizer 20A.

The synchronizer 20A transmits the synchronization request message to the time synchronization server 12 with the synchronization period determined by the determiner 20L. That is, the synchronizer 20A transmits the synchronization message (synchronization request message) to the time synchronization server 12, when the time elapses from when last time the synchronization request message was transmitted to the time synchronization server 12 becomes the synchronization period determined by the determiner 20L at the last minute.

Next, an example of a procedure of information processing executed in the time synchronization client 10 will be described.

Figure 4:
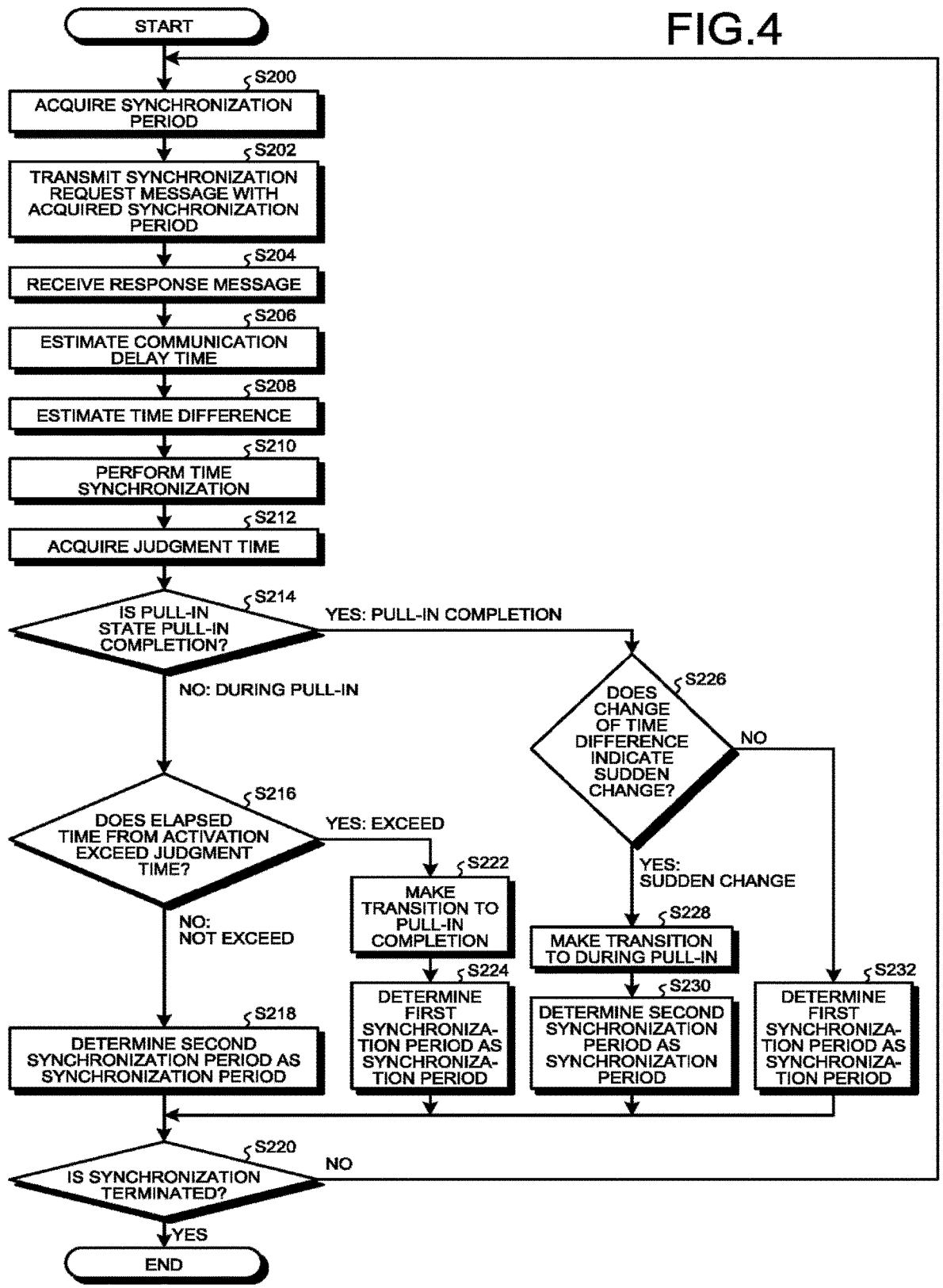
FIG. 4 is a flowchart illustrating an example of a procedure of information processing.

FIG. 4 is a flowchart illustrating an example of a procedure of information processing executed in the time synchronization client 10. The time synchronization client 10 repeatedly executes the procedure illustrated in FIG. 4 when power is supplied to the components of the time synchronization client 10 and the time synchronization client 10 is activated.

First, the communicator 20D acquires the synchronization period from the determiner 20L (step S200). Note that the processing of step S200 may be omitted in a stage after the activation of the controller 20 and where the synchronization request message has not yet been transmitted to the time synchronization server 12.

Next, the communicator 20D transmits the synchronization request message to the time synchronization server 12 with the synchronization period acquired in step S200 (step S202). As described above, the communicator 20D transmits the synchronization request message to the time synchronization server 12, when the time according to the synchronization period determined by the synchronization period determiner 20C at the last minute has elapsed from when last time the synchronization request message was transmitted to the time synchronization server 12. Note that the communicator 20D may just transmit the synchronization request message to the time synchronization server 12 regardless of the synchronization period in a stage after the activation of the controller 20, and where the synchronization request message has not yet been transmitted to the time synchronization server 12 (that is, in a stage of first transmission of the synchronization request message after the activation).

Next, the communicator 20D receives the response message from the time synchronization server 12 (step S204). Next, the delay time estimator 20E estimates the communication delay time (step S206). As described above, the delay time estimator 20E estimates the communication delay time, using the time stamp T1 as the local time of when the synchronization request message is transmitted in step S202, the time stamp T4 as the local time of when the response message is received in step S204, and the time stamps T2 and T3 included in the response message.

Next, the time difference estimator 20F estimates the time difference between the reference time of the time synchronization server 12 and the local time of the time synchronization client 10 by the clock 20B (step S208). As described above, the time difference estimator 20F estimates the time difference, using the time stamp T4 as the local time of when the response message is received in step S204, the time stamps T2 and T3 included in the response message, and the communication delay time estimated in step S206.

Next, the time synchronizer 20G performs the time synchronization of the clock 20B, using the time difference estimated in step S208 (step S210). In step S210, the time synchronizer 20G sets the time difference estimated in step S208 to the clock 20B. With the setting, the local time clocked by the clock 20B is shifted by the time difference, and is time synchronized with the reference time clocked by the time synchronization server 12.

Next, the judgment time acquirer 20H acquires the judgment time (step S212). Next, the level judger 20I determines whether the pull-in state managed by the pull-in state manager 20J is the pull-in completion (step S214). Note that, as described above, the pull-in state managed by the pull-in state manager 20J is the during pull-in in an initial state just after the activation.

When the pull-in state is the during pull-in (step S214: No), the processing proceeds to step S216.

In step S216, the level judger 20I judges whether the elapsed time from activation of the time synchronization client 10 exceeds the judgment time acquired in step S212 (step S216). When the elapsed time does not exceed the judgment time (step S216: No), the processing proceeds to step S218.

In step S218, the determiner 20L determines the second synchronization period as the synchronization period (step S218). Then, the determiner 20L outputs the determined synchronization period to the communicator 20D. Then, the processing proceeds to step 3220.

In step S220, the controller 20 determines whether terminating the synchronization processing (step S220). For example, the controller 20 performs determination of step S220 by judging whether a signal indicating shutdown of the time synchronization client 10 has been received with an operation instruction of the UI 22 by the user.

When affirmative determination is made in step S220 (step S220: Yes), the present routine is terminated. On the other hand, when negative determination is made in step S220 (step S220: No), the processing returns to step S200 above.

Meanwhile, when the level judger 20I judges that the elapsed time from activation of the time synchronization client 10 exceeds the judgment time acquired in step S212 in the processing of step S216 above (step S216: Yes), the processing proceeds to step S222.

In step S222, the pull-in state manager 20J transitions the pull-in state from the during pull-in to the pull-in completion (step S222). Next, the level judger 20I determines the first synchronization period as the synchronization period (step S224). Then, the determiner 20L outputs the determined synchronization period to the communicator 20D, and the processing proceeds to step S220 above.

Meanwhile, when the pull-in state managed by the pull-in state manager 20J is judged to be the pull-in completion in step S214 above (step S214: Yes), the processing proceeds to step S226.

In step S226, the sudden change judger 20K judges whether the change of the time difference estimated in step S208 indicates the sudden change (step S226). When the change is judged to indicate the sudden change (step S226: Yes), the processing proceeds to step S228. In step S228, the pull-in state manager 20J transitions the pull-in state from the pull-in completion to the during pull-in (step S228). Next, the level judger 20I determines the second synchronization period as the synchronization period (step S230). Then, the determiner 20L outputs the determined synchronization period to the communicator 20D, and the processing proceeds to step S220 above.

On the other hand, when the change is judged not to indicate the sudden change in step S226 above (step S226: No), the processing proceeds to step S232. In step S232, the level judger 20I determines the first synchronization period as the synchronization period (step S232). Then, the determiner 20L outputs the determined synchronization period to the communicator 20D, and the processing proceeds to step S220.

As described above, the time synchronization client 10 of the present embodiment includes the synchronizer 20A and the determiner 20L. The synchronizer 20A performs the time synchronization according to the time information (the time stamps T2 and T3) received by communicating with the time synchronization server 12 at every synchronization period. The determiner 20L determines the second synchronization period shorter than the first synchronization period of when the synchronization accuracy is the target level or more, as the synchronization period, when the elapsed time from activation of the time synchronization client 10 does not exceed the judgment time.

In this way, the time synchronization client 10 transmits the synchronization request message to the time synchronization server 12 with the second synchronization period and performs the time synchronization, when the elapsed time from activation of the time synchronization client 10 does not exceed the judgment time. The second synchronization period is shorter than the first synchronization period that is the synchronization period of when the synchronization accuracy is the target level or more. That is, when the elapsed time from activation of the time synchronization client 10 does not exceed the judgment time, the time synchronization client 10 determines the second synchronization period shorter than the first synchronization period of when the synchronization accuracy is the target level or more, as the synchronization period, recognizing that the synchronization accuracy is less than the target level.

Therefore, the time synchronization client 10 of the present embodiment can regulate the time required to reach the synchronization accuracy of the target level, and can reduce the time to reach the synchronization accuracy of the target level.

Therefore, the time synchronization client 10 of the present embodiment can achieve reduction of time from the activation to reach the synchronization accuracy of the target level.

Further, in the conventional technology, adjustment to make the synchronization period long is sometimes performed even when a value different from the actual measured value is calculated at the time of estimation of the communication delay time or estimation of the time difference. Therefore, in the conventional technology, the time from the activation to reach the synchronization accuracy of the target level may become long.

Meanwhile, in the present embodiment, the time synchronization client 10 transmits the synchronization request message to the time synchronization server 12 with the second synchronization period, and performs the time synchronization, when the elapsed time from activation of the time synchronization client 10 does not exceed the judgment time. Therefore, the time synchronization client 10 of the present embodiment can achieve reduction of time from the activation to reach the synchronization accuracy of the target level.

Further, the time synchronization client 10 of the present embodiment transmits the synchronization request message with the second synchronization period when the change of the time difference is judged to indicate the sudden change, even if the elapsed time from activation of the time synchronization client 10 exceeds the judgment time.

Therefore, the time synchronization client 10 of the present embodiment can obtain the above effect and suppress a decrease in the synchronization accuracy.

Second Embodiment

In the present embodiment, a mode to determine a second synchronization period according to a correction factor for correcting a time difference between a reference time clocked by the time synchronization server 12 and a local time clocked by the clock 20B of the time synchronization client 10 will be described.

Hereinafter, different points from the above-describe embodiment will be mainly described, and configuration elements having similar functions to those of the above embodiments are denoted with the same names and reference signs as the above embodiments, and description thereof is omitted.

Figure 5:
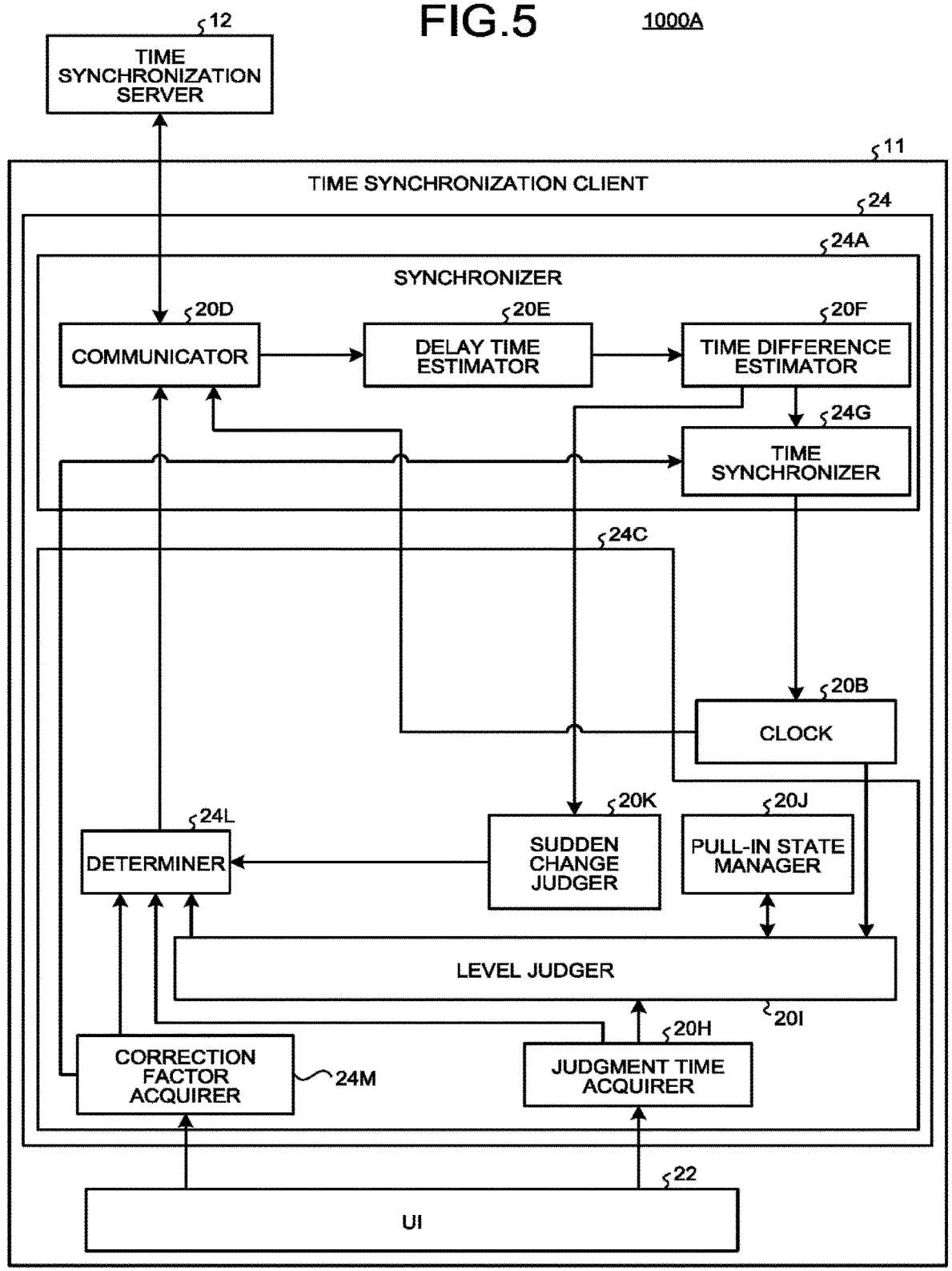
FIG. 5 is a diagram illustrating an example of a configuration of a synchronization system.

FIG. 5 is a diagram illustrating an example of a configuration of a synchronization system 1000A of the present embodiment. The synchronization system 1000A is different from that of the first embodiment in including a time synchronization client 11 in place of the time synchronization client 10.

The time synchronization client 11 includes a controller 24 and the UI 22. The time synchronization client 11 is different from the time synchronization client 10 of the first embodiment in including the controller 24 in place of the controller 20.

The controller 24 includes a synchronizer 24A, the clock 20B, and a synchronization period determiner 24C. The controller 24 is different from the controller 20 of the time synchronization client 10 of the first embodiment in including the synchronizer 24A in place of the synchronizer 20A and the synchronization period determiner 24C in place of the synchronization period determiner 20C.

The synchronizer 24A is different from the synchronizer 20A of the first embodiment in including a time synchronizer 24G in place of the time synchronizer 20G. The time synchronizer 24G will be described below.

The synchronization period determiner 24C includes the judgment time acquirer 20H, the level judger 20I, the pull-in state manager 20J, the sudden change judger 20K, a determiner 24L, and a correction factor acquirer 24M. The synchronization period determiner 24C is different from the synchronization period determiner 20C of the time synchronization client 10 of the first embodiment in including the determiner 24L in place of the determiner 20L and further including the correction factor acquirer 24M.

The correction factor acquirer 24M acquires a correction factor. The correction factor is a correction factor for correcting a time difference. The time difference is a time difference between a reference time of the time synchronization server 12 and a local time clocked by the clock 20B of the time synchronization client 11, and is estimated by a time difference estimator 20F, similarly to the first embodiment.

For example, the correction factor is expressed by 1/N, where the number of times of correction to correct the local time clocked by the clock 20B such that the time difference becomes zero is N. Note that N is an integer larger than 1. For example, when the number of times of correction is ten times, the correction factor is 0.1. When the number of times of correction is once, the correction factor is 1.0.

In the present embodiment, the correction factor acquirer 24M acquires the correction factor from the UI 22. A user operates the UI 22 to input the correction factor. With the operation, the correction factor acquirer 24M acquires the correction factor input by the user from the UI 22.

To be specific, the correction factor is favorably a value larger than 0 and less than 1.

Note that the correction factor acquirer 24M may acquire the correction factor expressed by a proportional gain, an integral gain, and a differential gain in proportional-integral-differential control (PID). That is, the correction factor acquirer 24M may acquire the correction factor by performing feedback by the PID control to reduce a deviation of a communication delay time to an elapsed time of when the correction factor is changed.

The determiner 24L determines a first synchronization period or a second synchronization period as a synchronization period, and outputs the determined synchronization period to the communicator 20D, similarly to the determiner 20L of the first embodiment.

Note that, in the present embodiment, the determiner 24L determines the second synchronization period according to the correction factor acquired by the correction factor acquirer 24M. Note that, as described above, the second synchronization period is shorter than the first synchronization period. Therefore, the determiner 24L determines the second synchronization period having a shorter synchronization period than the first synchronization period, and according to the correction factor acquired by the correction factor acquirer 24M.

In detail, the determiner 24L determines a product of a judgment time acquired by the judgment time acquirer 20H and the correction factor acquired by the correction factor acquirer 24M, as the second synchronization period. For example, when the correction factor is 0.1, the determiner 24L determines a time that is 1/10 the judgment time, as the second synchronization period.

Note that the determiner 24L may store, in advance, a database or a function representing the correspondence between the correction factor and the second synchronization period as a value (product) obtained by multiplying the judgment time by the correction factor. The determiner 24L then may determine the second synchronization period by deriving the second synchronization period corresponding to the correction factor acquired by the correction factor acquirer 24M from the database or the function.

Note that, when the correction factor acquirer 24M acquires the correction factor expressed by the proportional gain, the integral gain, and the differential gain in the PID control, the determiner 24L may just determine the second synchronization period by the following method. To be specific, the determiner 24L stores, in advance, relationship information indicating correspondence between the correction factor expressed by the proportional gain, the integral gain, and the differential gain, and a third synchronization period. The relationship information may be a function or a database.

As the third synchronization period, a synchronization period by which an error between the time difference corrected by the correction factor expressed by the proportional gain, the integral gain, and the differential gain (that is, the estimated time difference), and an actual time difference is minimized, may just be set. Note that the third synchronization period is shorter than the first synchronization period. The actual time difference is a measured value of a difference of actual time between the local time of the time synchronization client 11 by the clock 20B, and the reference time clocked by the time synchronization server 12. The third synchronization period may just be measured and determined in advance.

Then, the determiner 24L may just determine the third synchronization period corresponding to the correction factor acquired in the correction factor acquirer 24M, in the relationship information, as the second synchronization period.

The time synchronizer 24G of the synchronizer 24A performs time synchronization of the clock 20B, using a product of the time difference estimated by the time difference estimator 20F and the correction factor acquired in the correction factor acquirer 24M.

For example, the time synchronizer 20G sets the product of the time difference estimated by the time difference estimator 20F and the correction factor acquired by the correction factor acquirer 24M to the clock 20B. With the setting, the clock 20B corrects the local time to be clocked. With the correction, the local time clocked by the clock 20B is shifted by the value (product) obtained by multiplying the time difference estimated by the time difference estimator 20F by the correction factor, and is time synchronized toward the reference time clocked by the time synchronization server 12, by the correction factor.

Next, an example of a procedure of information processing executed in the time synchronization client 11 will be described.

Figure 6:
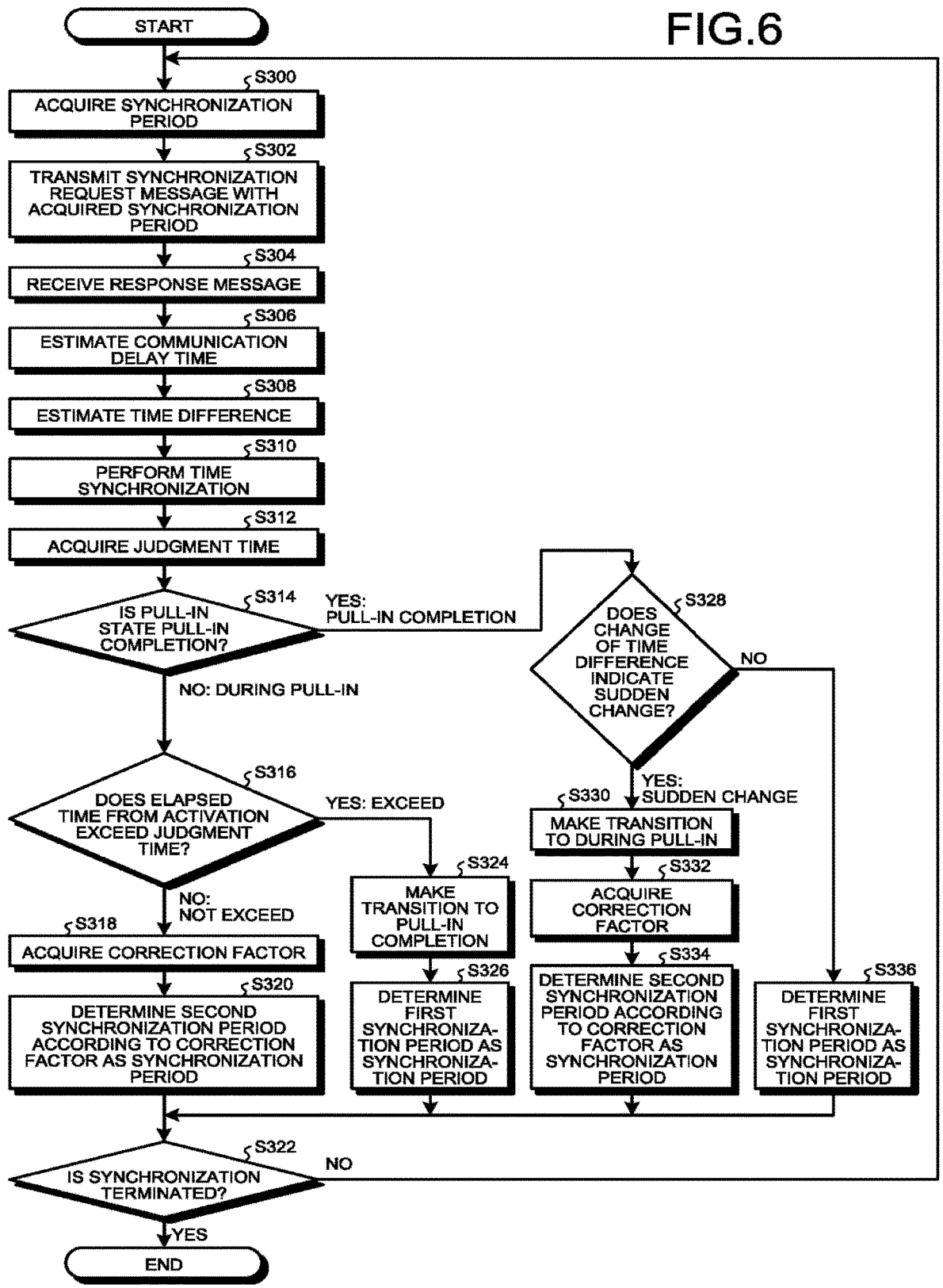
FIG. 6 is a flowchart illustrating an example of a procedure of information processing.

FIG. 6 is a flowchart illustrating an example of a procedure of information processing executed in the time synchronization client 11. The time synchronization client 11 repeatedly executes the procedure illustrated in FIG. 6, when power is supplied to the components of the time synchronization client 11 and the time synchronization client 11 is activated.

First, the time synchronization client 11 performs processing of steps S300 to S308, similarly to steps S200 to S208 of the first embodiment (see FIG. 4).

Next, the time synchronizer 24G performs the time synchronization of the clock 20B, using the product of the time difference estimated in step S308 and the correction factor acquired last time by the correction factor acquirer 24M (step S310). With the time synchronization, the local time clocked by the clock 20B is shifted by the value obtained by multiplying the time difference estimated in step S308 by the correction factor acquired last time by the correction factor acquirer 24M, and is time synchronize toward the reference time clocked by the time synchronization server 12, by the correction factor.

Next, the controller 24 performs processing of steps S312 to S316, similarly to steps S212 to S216 of the first embodiment. In step 3316, the level judger 20I judges whether the elapsed time from activation of the time synchronization client 11 exceeds the judgment time acquired in step S312 (step S316). When the elapsed time does not exceed the judgment time (step S316: No), the processing proceeds to step S318.

In step S318, the correction factor acquirer 24M acquires the correction factor (step S318). Next, the determiner 24L determines the second synchronization period according to the correction factor acquired in step 3318, as the synchronization period (step S320). Then, the processing proceeds to step S322.

In step S322, the controller 24 determines whether terminating the synchronization processing (step S322). The processing of step S322 is similar to that of step S220 above. When affirmative determination is made in step S322 (step S322: Yes), the present routine is terminated. Meanwhile, when negative determination is made in step S322 (step S322: No), the processing returns to step S300 above.

On the other hand, when affirmative determination is made in step S316 above (step S316: Yes), the controller 24 executes the processing of steps S324 and S326, and the processing proceeds to step S322 above. Steps S324 and S326 are similar to step S222 and S224 of the above-described embodiment.

On the other hand, when affirmative determination is made in step S314 (step S314: Yes), the processing proceeds to step S328. In step S328, the sudden change judger 20K judges whether change of the time difference estimated in step S308 indicates sudden change (step S328). When the change is judged to indicate the sudden change (step S328: Yes), the processing proceeds to step S330. In step S330, the pull-in state manager 20J transitions a pull-in state from pull-in completion to during pull-in (step S330).

Next, the correction factor acquirer 24M acquires the correction factor (step S332). The processing of step S332 is similar to that of step S318.

Next, the determiner 24L determines the second synchronization period according to the correction factor acquired in step S332, as the synchronization period (step S334). Then, the processing proceeds to step S322 above.

On the other hand, when negative determination is made in step S328 (step S328: No), the processing proceeds to step S336. Step S336 is similar to step S232 of the first embodiment. Then, the processing proceeds to step S322 above.

As described above, in the time synchronization client 11 of the present embodiment, the determiner 24L determines the second synchronization period, using the correction factor for correcting the time difference acquired by the correction factor acquirer 24M. Therefore, the time synchronization client 11 of the present embodiment can achieve improvement of synchronization accuracy, in addition to the effect of the first embodiment.

Third Embodiment

In the present embodiment, a mode to derive the correction factor used in the second embodiment according to a communication delay time will be described.

Hereinafter, different points from the above-described embodiments will be mainly described, and configuration elements having similar functions to those of the above embodiments are denoted with the same name and reference signs as the above embodiments, and description thereof is omitted.

Figure 7:
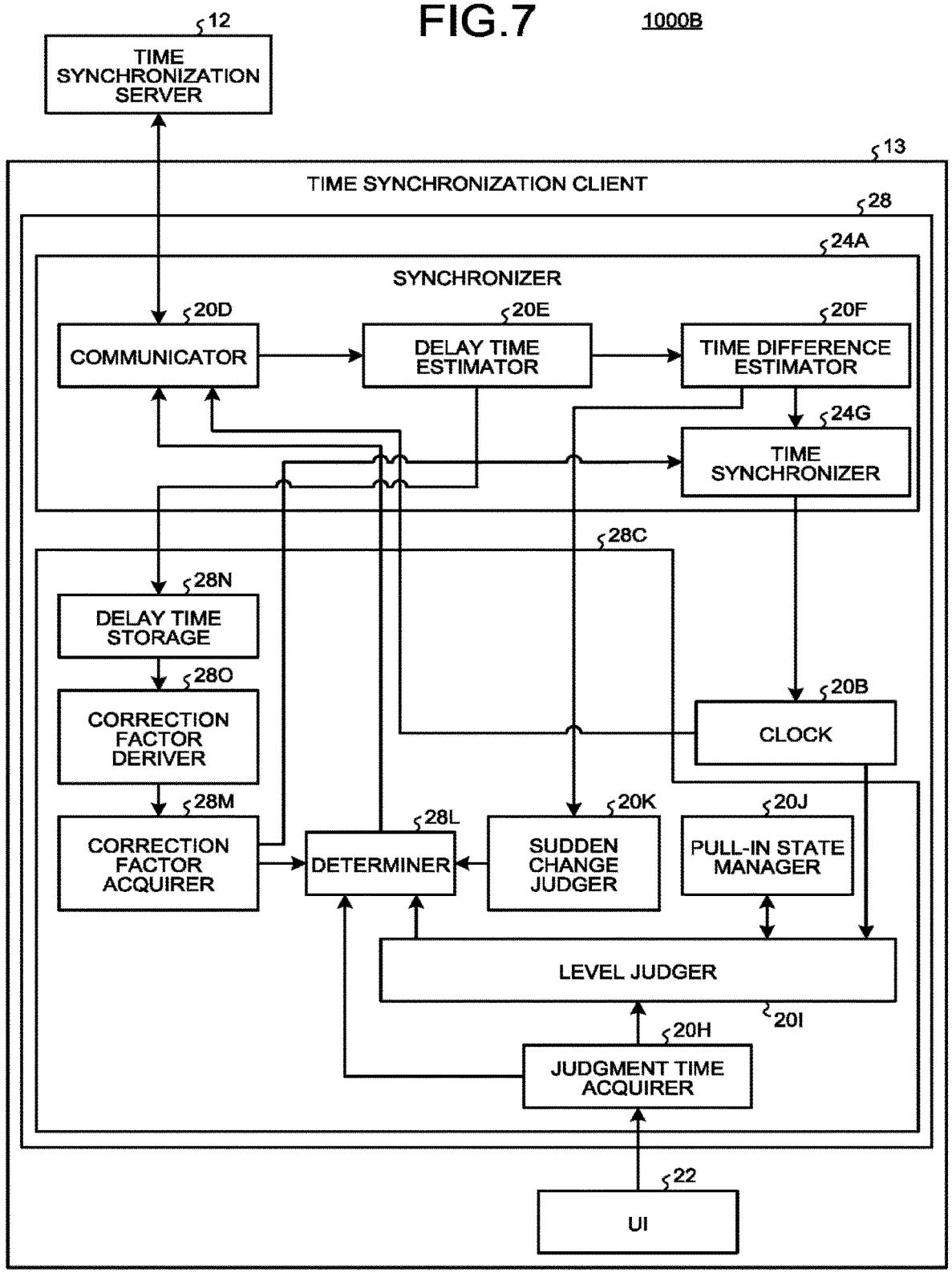
FIG. 7 is a diagram illustrating a configuration example of a synchronization system.

FIG. 7 is a diagram illustrating an example of a configuration of a synchronization system 1000B of the present embodiment. The synchronization system 1000B is different from the first and second embodiments in including a time synchronization client 13 in place of the time synchronization client 10 or the time synchronization client 11.

The time synchronization client 13 includes a controller 28 and the UI 22. The time synchronization client 13 is different from the time synchronization client 10 of the first embodiment in including the controller 28 in place of the controller 20.

The controller 24 includes the synchronizer 24A, the clock 20B, and a synchronization period determiner 28C. The controller 24 is different from the controller 20 of the time synchronization client 10 of the first embodiment in including the synchronizer 24A in place of the synchronizer 20A, and the synchronization period determiner 28C in place of the synchronization period determiner 20C. Note that the synchronizer 24A is similar to that of the second embodiment. That is, the controller 28 is different from the controller 24 of the second embodiment in including the synchronization period determiner 28C in place of the synchronization period determiner 24C.

The synchronization period determiner 28C includes the judgment time acquirer 20H, the level judger 20I, the pull-in state manager 20J, the sudden change judger 20K, a determiner 28L, a correction factor acquirer 28M, a delay time storage 28N, and a correction factor deriver 28O. The synchronization period determiner 28C is different from the synchronization period determiner 24C of the second embodiment in including the correction factor acquirer 28M and the determiner 28L in place of the correction factor acquirer 24M and the determiner 24L, and further including the correction factor deriver 28O and the delay time storage 28N.

The correction factor acquirer 28M acquires a correction factor. In the present embodiment, the correction factor acquirer 28M acquires the correction factor from the correction factor deriver 28O.

The correction factor deriver 28O derives the correction factor. The correction factor deriver 28O determines the correction factor according to a statistic of a communication delay time estimated by the delay time estimator 20E. To be specific, the delay time storage 28N stores the communication delay time estimated by the delay time estimator 20E. The delay time storage 28N sequentially stores a predetermined number of the communication delay times from the latest communication delay time estimated by the delay time estimator 20E to retrospective ones.

The correction factor deriver 28O calculates a statistic of the communication delay time from the plurality of communication delay times stored in the delay time storage 28N. For example, the correction factor deriver 28O calculates an additional value and an average value of the plurality of communication delay times, a value calculated by weighting, and the like, as the statistic.

Further, the correction factor deriver 28O stores the statistic and a correction factor for making a synchronization error small in association with each other in advance. The synchronization error indicates a difference between the local time after the clock 20B is time synchronized by the time synchronizer 24G, and a measured value of a reference time of a time synchronization server 12. The correction factor for making the synchronization error small may just be measured in advance for each statistic and stored in association with the statistic in advance.

The correction factor deriver 28O then derives the correction factor by reading the correction factor for making the synchronization error small, corresponding to the statistic calculated from the plurality of communication delay times stored in the delay time storage 28N. In this way, the correction factor deriver 28O derives the correction factor according to parameters of distribution of the plurality of communication delay times stored in the delay time storage 28N.

Note that the correction factor deriver 28O may create and stores, in advance, a function to derive the correction factor for making the synchronization error small from the statistic. In this case, the correction factor deriver 28O may just derive a correction value by assigning the statistic calculated from the plurality of communication delay times stored in the delay time storage 28N to the function.

The correction factor acquirer 28M then may just acquire the correction factor derived by the correction factor deriver 28O and output the correction factor to the determiner 28L.

The determiner 28L determines a synchronization period, similar to the determiner 24L of the second embodiment, except for use of the correction factor received from the correction factor acquirer 28M. Further, in the present embodiment, the time synchronizer 24G may just perform time synchronization, using the correction factor acquired by the correction factor acquirer 28M, in place of the correction factor acquirer 24M.

Next, an example of a procedure of information processing executed in the time synchronization client 13 will be described.

Figure 8:
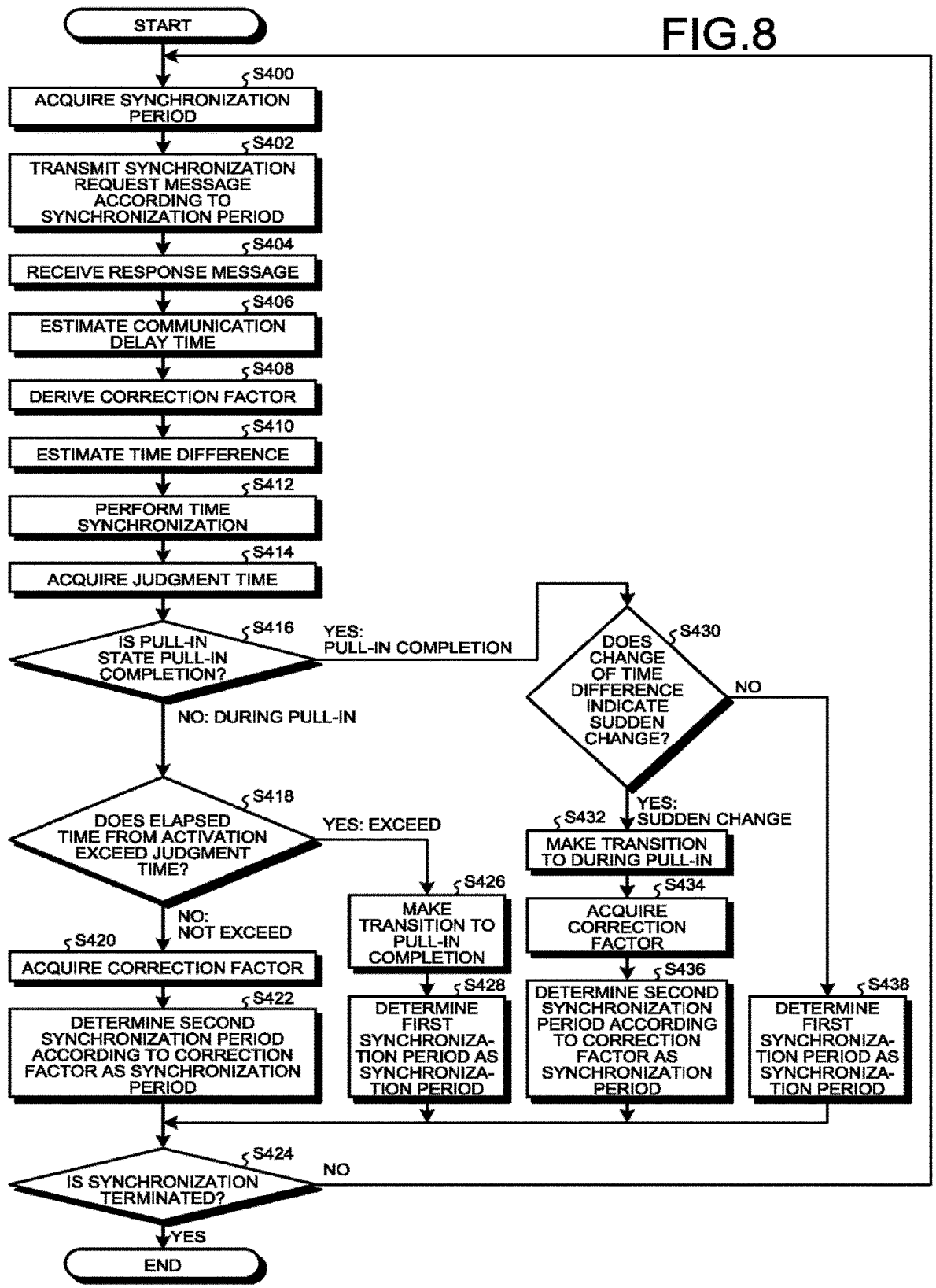
FIG. 8 is a flowchart illustrating an example of a procedure of information processing.

FIG. 8 is a flowchart illustrating an example of a procedure of information processing executed in the time synchronization client 13. The time synchronization client 13 repeatedly executes the procedure illustrated in FIG. 8 when power is supplied to the components of the time synchronization client 13 and the time synchronization client 13 is activated.

First, the time synchronization client 13 performs processing of steps S400 to 3406, similarly to step S200 to S206 of the first embodiment (see FIG. 4). Note that the delay time estimator 20E stores the calculated communication delay time to the delay time storage 28N in step S406.

Next, the correction factor deriver 280 derives the correction factor, using the communication delay time stored in the delay time storage 28N (step S408).

Next, the time difference estimator 20F estimates the time difference (step S410). The processing of step S410 is similar to that of step S208 of the first embodiment.

Next, the time synchronizer 24G performs the time synchronization of the clock 20B, using the product of the time difference estimated in step S410 and the correction factor derived in step S408 (step S412). With the time synchronization, the local time clocked by the clock 20B is shifted by the value obtained by multiplying the time difference estimated in step S410 by the correction factor derived by the correction factor deriver 280 in step S408. Therefore, the local time clocked by the clock 20B is synchronized toward the reference time clocked by the time synchronization server 12, by the correction factor.

Next, the controller 28 performs processing of step S414 to S418, similarly to the processing of steps S212 to S216 of the first embodiment. In step S418, the level judger 20I judges whether an elapsed time from activation of the time synchronization client 13 exceeds a judgment time acquired in step S414 (step S418). When the elapsed time does not exceed the judgment time (step S418: No), the processing proceeds to step S420.

In step S420, the correction factor acquirer 28M acquires the correction factor derived in step S408 (step S420). Next, the determiner 28L determines a second synchronization period according to the correction factor acquired in step S420, as a synchronization period (step S422). Then, the processing proceeds to step S424.

In step S424, the controller 28 determines whether terminating the synchronization processing (step S424). The processing of step S424 is similar to that of step S220. When affirmative determination is made in step S424 (step S424: Yes), the present routine is terminated. On the other hand, when negative determination is made in step S424 (step S424: No), the processing returns to step S400 above.

On the other hand, when affirmative determination is made in step S418 above (step S418: Yes), the controller 28 executes processing of steps S426 and S428, and the processing proceeds to step S424. The processing of steps S426 and S428 is similar to that of steps S222 and S224 of the embodiment above.

On the other hand, when affirmative determination is made in step S416 (step S416: Yes), the processing proceeds to step S430. In step S430, the sudden change judger 20K judges whether change of the time difference estimated in step S410 indicates sudden change (step S430). When the change is judged to indicate the sudden change (step S430: Yes), the processing proceeds to step S432. In step S432, the pull-in state manager 20J transitions a pull-in state from pull-in completion to during pull-in (step S432).

Next, the correction factor acquirer 28M acquires the correction factor derived in step S408 (step S434). The processing of step S434 is similar to that of step S420.

Next, the determiner 28L determines the second synchronization period according to the correction factor acquired in step S434, as the synchronization period (step S436). Then, the processing proceeds to step S424 above.

On the other hand, when negative determination is made in step S430 (step S430: No), the processing proceeds to step S438. Step S438 is similar to step S232 of first embodiment. Then, the processing proceeds to step S424 above.

As described above, in the time synchronization client 13 of the present embodiment, the correction factor deriver 280 derives the correction factor according to the communication delay time. The determiner 28L then determines the second synchronization period, using the derived correction factor.

That is, the time synchronization client 13 of the present embodiment derives the correction factor according to a communication load state of the network 14. Therefore, the time synchronization client 13 of the present embodiment can determine the second synchronization period according to the communication load state of the network 14.

Therefore, the time synchronization client 13 of the present embodiment can achieve improvement of synchronization accuracy and the time synchronization according to the communication load state, in addition to the effect of the first embodiment.

Hardware Configuration

Figure 9:
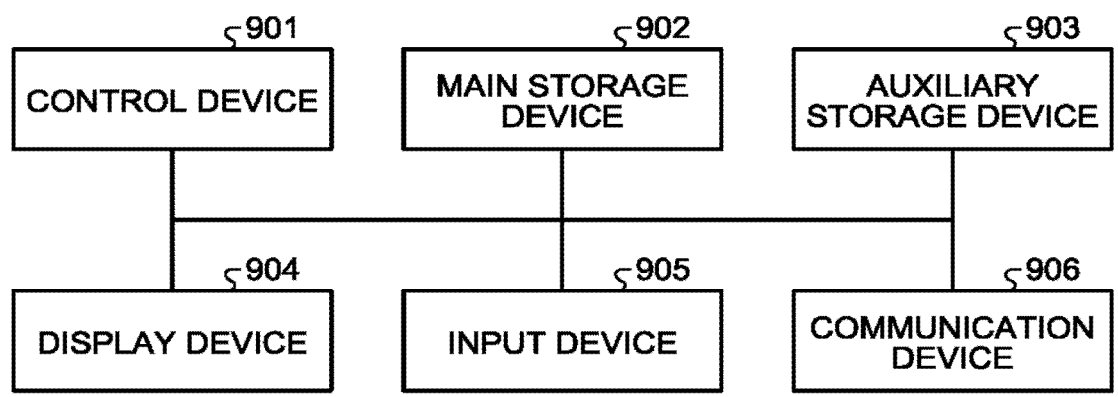
FIG. 9 is a diagram illustrating an example of a hardware configuration.

FIG. 9 is a diagram illustrating an example of a hardware configuration of the time synchronization client 10, the time synchronization client 11, the time synchronization client 13, and the time synchronization server 12 of the embodiments (hereinafter, referred to as the devices of the embodiments). The devices of the embodiments includes a control device 901 such as a CPU, a main storage device 902 such as a ROM and a RAM, an auxiliary storage device 903 such as a HDD and an SSD, a display device 904, an input device 905 such as a keyboard and a mouse, and a communication device 906 such as a communication interface, and are hardware communications using a normal computer.

The program executed in the devices of the embodiments are provided by being stored in a computer-readable storage medium such as a CD-ROM, a CD-R, a memory card, a digital versatile disk (DVD), or a flexible disk (FD), in file of an installable format or an executable format.

Further, the program executed in the devices of the embodiments may be stored on a computer connected to a network such as the Internet and provided by being downloaded through the network. Further, the program executed in the devices of the embodiments may be provided or distributed through the network such as the Internet. Further, the program executed in the devices of the embodiments may be provided by being incorporated into a ROM or the like in advance.

The program executed in the devices of the embodiments has a module configuration for realizing the above-described components on the computer. As actual hardware, the CPU reads the program from the ROM or the HDD onto the RAM and executes the program, and thus the above-described components are realized on the computer. Note that, when at least a part of the above-described components is realized by hardware such as an IC, the devices of the embodiments may just further include the IC or the like.

For example, as for the steps of the flowcharts in the embodiments, unless contrary to the nature thereof, the execution order of the steps may be changed, a plurality of the steps may be implemented at the same time, or the steps may be implemented in a different order in every implementation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A time synchronization client comprising:
one or more processors configured to:
perform time synchronization according to time information received by communicating with a time synchronization server at every synchronization period;
determine a second synchronization period shorter than a first synchronization period of when synchronization accuracy is a target level or more, as the synchronization period, when an elapsed time from activation of the time synchronization client does not exceed a judgment time; and
acquire a correction factor for correcting a time difference between a reference time clocked by the time synchronization server and a local time of the time synchronization client, wherein
the correction factor is acquired by performing feedback by PID control to reduce a deviation of a communication delay time between the time synchronization client and the time synchronization server with respect to the elapsed time of when the correction factor is changed, and
in the determination, the second synchronization period is determined according to the correction factor.

2. The device according to claim 1, wherein the one or more processors are configured to determine the first synchronization period as the synchronization period, when the elapsed time exceeds the judgment time.

3. The device according to claim 1, wherein
the one or more processors are further configured to acquire the judgment time, and
the one or more processors are configured to determine the synchronization period using the judgment time.

4. The device according to claim 1, wherein
the one or more processors are further configured to judge whether change of a time difference between a reference time clocked in the time synchronization server and a local time of the time synchronization client indicates sudden change, and
the one or more processors are configured to determine the second synchronization period as the synchronization period, when the elapsed time from activation of the time synchronization client exceeds the judgment time, and when it is judged that the change indicates the sudden change.

5. The device according to claim 1, wherein
the correction factor is a value larger than 0 and less than 1, and
the one or more processors are configured to determine a product of the judgment time and the correction factor as the second synchronization period.

6. The device according to claim 1, wherein the one or more processors are configured to:
acquire the correction factor expressed by a proportional gain, an integral gain, and a differential gain in the PID control, and
determine a third synchronization period corresponding to the acquired correction factor, in relationship information indicating correspondence between the third synchronization period and the correction factor, as the second synchronization period.

7. The device according to claim 1, wherein
the one or more processors are further configured to derive the correction factor according to a communication delay time between the time synchronization client and the time synchronization server, and
the one or more processors are configured to acquire the derived correction factor.

8. The device according to claim 7, wherein the one or more processors are configured to determine the correction factor according to a statistic of the communication delay time.

9. A synchronization method executed in a time synchronization client, the synchronization method comprising:
performing time synchronization according to time information received by communicating with a time synchronization server at every synchronization period; and
determining, by a determiner, a second synchronization period shorter than a first synchronization period of when synchronization accuracy is a target level or more, as the synchronization period, when an elapsed time from activation of the time synchronization client does not exceed a judgment time; and
acquiring a correction factor for correcting a time difference between a reference time clocked by the time synchronization server and a local time of the time synchronization client, wherein
the correction factor is acquired by performing feedback by PID control to reduce a deviation of a communication delay time between the time synchronization client and the time synchronization server with respect to the elapsed time of when the correction factor is changed, and
in the determining, the second synchronization period is determined according to the correction factor.

10. A computer program product comprising a non-transitory computer-readable medium including programmed instructions, the instructions causing a computer to execute:
performing time synchronization according to time information received by communicating with a time synchronization server at every synchronization period;
determining a second synchronization period shorter than a first synchronization period of when synchronization accuracy is a target level or more, as the synchronization period, when an elapsed time from activation of the time synchronization client does not exceed a judgment time; and
acquiring a correction factor for correcting a time difference between a reference time clocked by the time synchronization server and a local time of the time synchronization client, wherein
the correction factor is acquired by performing feedback by PID control to reduce a deviation of a communication delay time between the time synchronization client and the time synchronization server with respect to the elapsed time of when the correction factor is changed, and
in the determining, the second synchronization period is determined according to the correction factor.

11. A synchronization system comprising:
a time synchronization client; and
a time synchronization server,
the time synchronization client comprising:

one or more processors configured to:
- perform time synchronization according to time information received by communicating with the time synchronization server at every synchronization period; and
- determine a second synchronization period shorter than a first synchronization period of when synchronization accuracy is a target level or more, as the synchronization period, when an elapsed time from activation of the time synchronization client does not exceed a judgment time; and
- acquire a correction factor for correcting a time difference between a reference time clocked by the time synchronization server and a local time of the time synchronization client, wherein the correction factor is acquired by performing feedback by PID control to reduce a deviation of a communication delay time between the time synchronization client and the time synchronization server with respect to the elapsed time of when the correction factor is changed, and in the determination, the second synchronization period is determined according to the correction factor.

\* \* \* \* \*